(12) United States Patent
August et al.

(10) Patent No.: US 7,433,836 B1
(45) Date of Patent: Oct. 7, 2008

(54) ENTERPRISE INFORMATION AND COMMUNICATION SYSTEM HAVING A TRANSACTION MANAGEMENT ENGINE FOR MANAGING BILLS VOUCHERS PURCHASES AND EMAIL NOTIFICATIONS

(75) Inventors: Katherine G. August, Matawan, NJ (US); Theodore Sizer, II, Little Silver, NJ (US); Michelle McNerney, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 646 days.

(21) Appl. No.: 09/653,810

(22) Filed: Sep. 1, 2000

(51) Int. Cl.
*G07F 19/00* (2006.01)
(52) U.S. Cl. .......................... 705/34; 705/30
(58) Field of Classification Search .................. 709/217, 709/218, 219, 222, 228; 370/352; 705/51, 705/30, 34
See application file for complete search history.

(56) References Cited

U.S. PATENT DOCUMENTS 5,901,287 A * 5/1999 Bull et al. .................... 709/218
6,345,294 B1 * 2/2002 O'Toole et al. .............. 709/222
6,510,152 B1 * 1/2003 Gerszberg et al. ........... 370/352
6,571,290 B2 * 5/2003 Selgas et al. ................. 709/228
2001/0042043 A1 * 11/2001 Shear et al. ................... 705/51

OTHER PUBLICATIONS

Kit G. August, Victor B. Lawrence, and Burton R. Saltzberg, *An Introduction to Future Communications Services and Access*, Bell Labs Technical Journal, vol. 4, No. 2, Apr.-Jun. 1999, pp. 3-20, Published Sep. 3, 1999.

* cited by examiner

*Primary Examiner*—Le Luu

(57) ABSTRACT

An information and communication system uses an web page like environment or "Personal Space" to integrate a plurality of communication and monitoring functions. Home or enterprise automation components are linked together via wired or unwired network links and accessed via the Personal Space. Communications services are accessed through a wide variety of devices and facilitated by the Personal Space. Databases are built and used to customize user services. User profiles and system use patterns are compared and analyzed to continuously improve system performance.

17 Claims, 6 Drawing Sheets

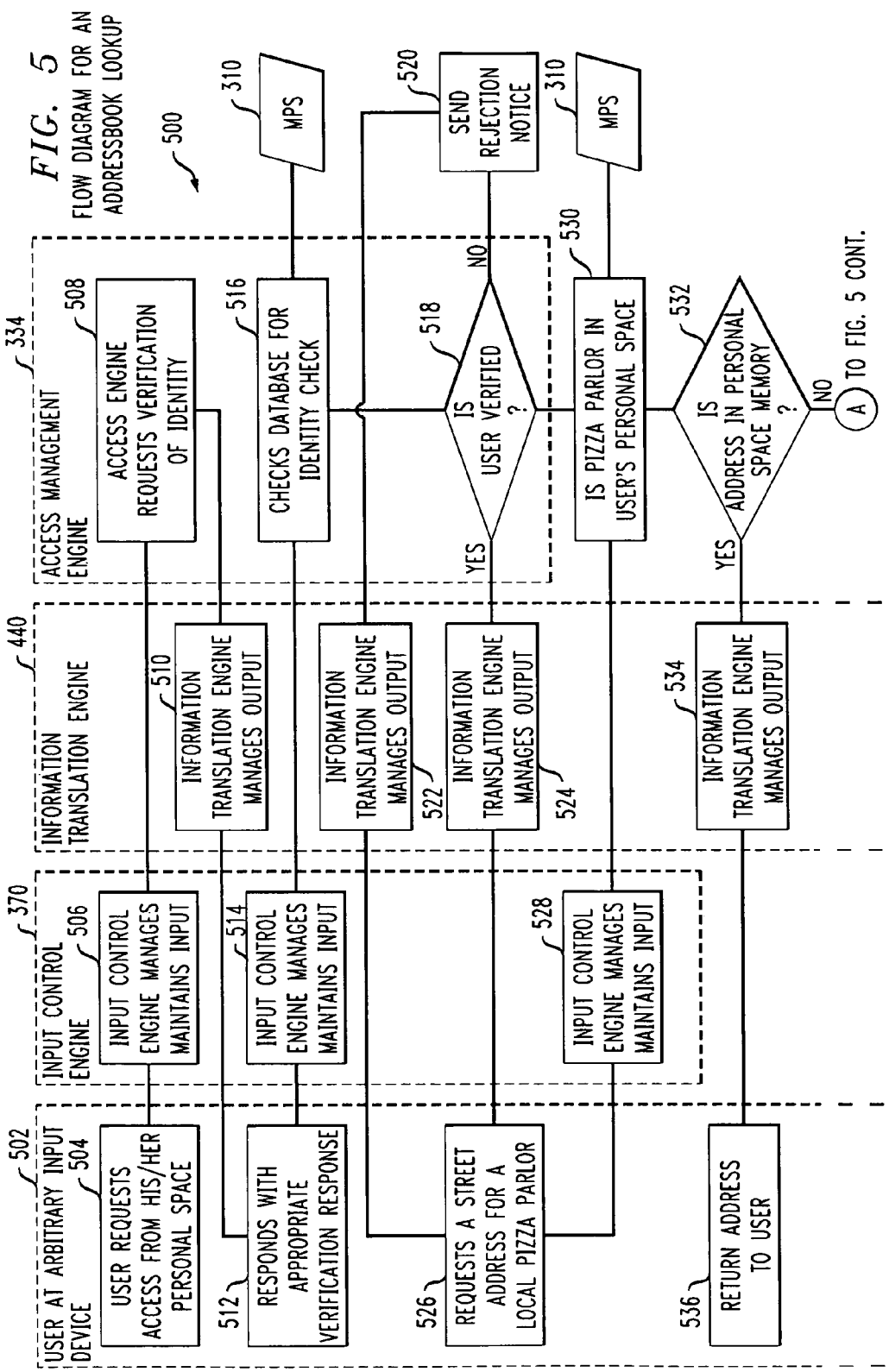

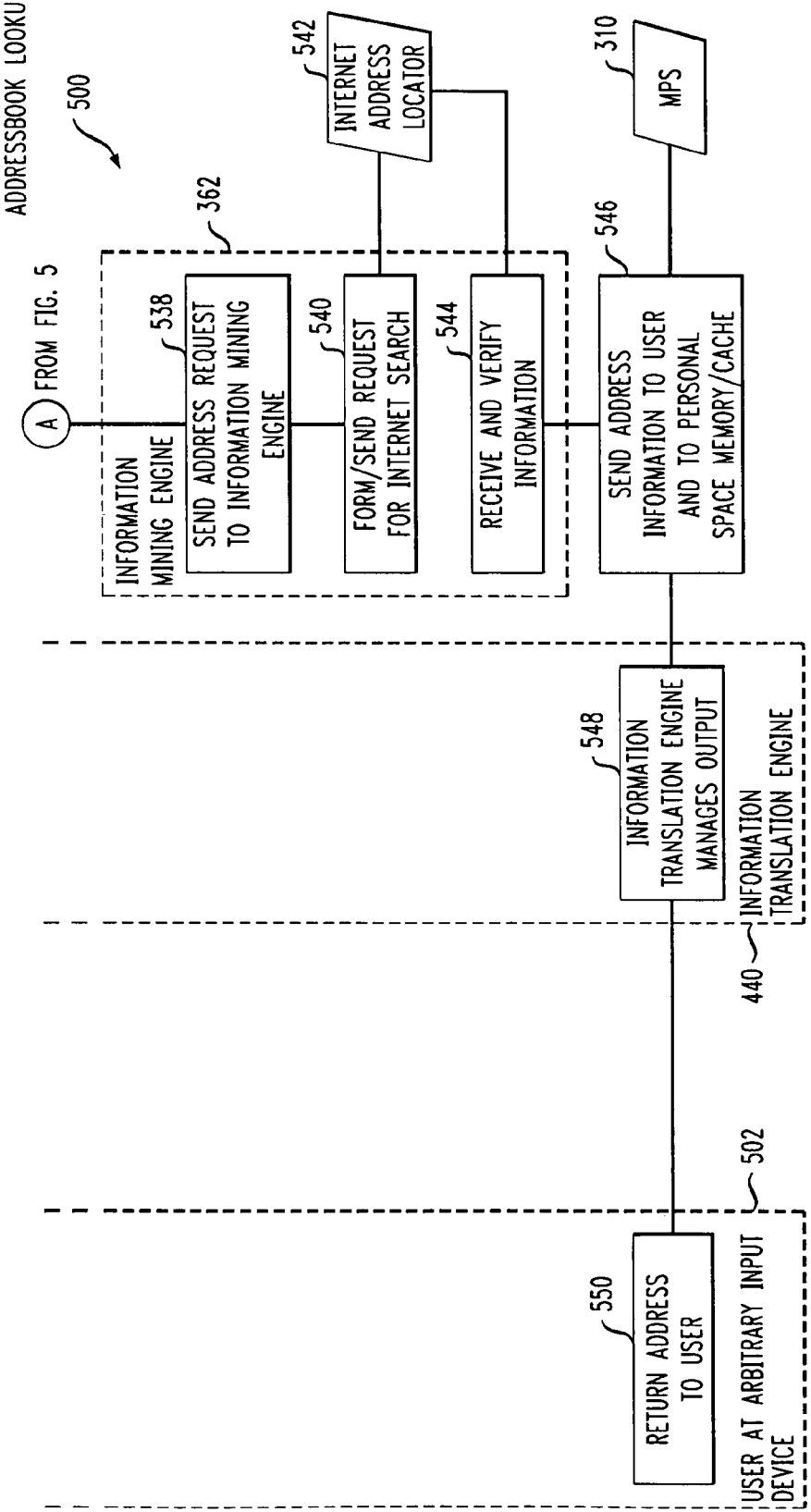

ENTERPRISE INFORMATION AND COMMUNICATION SYSTEM HAVING A TRANSACTION MANAGEMENT ENGINE FOR MANAGING BILLS VOUCHERS PURCHASES AND EMAIL NOTIFICATIONS

FIELD OF THE INVENTION

This invention relates to the art information and communication systems. While the invention is particularly directed to the art of communicating within a business and a community of customers or within a family or household and a network of household associates, and will be thus described with specific reference thereto, it will be appreciated that the invention may have usefulness in other fields and applications. For example, the present invention may be scaled upward to be used to simplify and speed communication between the members and associates of a university, government agency or worldwide organization.

BACKGROUND OF THE INVENTION

Presently, people communicate in a large number of disparate ways. For example, within a family or a business, people leave notes for one another, leave phone messages on answering machines, and pass messages via word-of-mouth. More recently faxes, e-mails and Internet messaging software help us keep in touch with family, friends and business associates.

While these communication methods have advantages, they do have limitations. Notes stuck to refrigerator doors or computer monitors lend themselves only to very short messages. Phone messages can be longer but are unidirectional. When another party to a phone call is unavailable, one can leave a message for the other party. However, one can not readily find out the answer to a question. For example, while one can leave a message indicating one's schedule, one must wait for a return phone call to find out if ones schedule is acceptable. Of course, the return phone call may never come.

Faxes and e-mails suffer from the same limitation. Like the phone, Internet messaging software requires that the other party be available at the time communication is desired.

Even when the other party is available to complete the communication, the phone call or chat request can represent a disruption. For example, a phone call may interrupt one's train of thought, or interrupt a meeting with a busy colleague. One may answer the phone because one recognizes the need for the caller to have the information being requested. However, it may be better if the caller could collect that information without causing the disruption.

Another example of a disruptive communication event is that performed by some medical patients. For example, a heart patient may wear a heart monitor for recording heart rate and sinus rhythms. On a regular basis, the patient must take time to deliver the logged information to his health care provider or compliance manager. Presently, in the best situations, the patient must connect the monitor to a communications device such as a modem or a personal computer that is connected to a communications network, and initiate a data transfer. In a less desirable situation the patient must make regular visits to his health care provider, so that the health care provider can extract the logged information from the monitor. This can be an expensive and time-consuming procedure.

Where the patient is able to remotely upload the logged data, the patient is still required to interrupt normal activities to perform the upload. Furthermore, the patient is required to learn how to connect the monitor to the communication system and how do initiate the communication. Some elderly patients find this provisioning or setup and connection procedure cumbersome and stressful.

By way of summary, presently, premise networks, web sites, telephony services, conference services, etc. require significant provisioning and set-up on the part of a service provider and customers. Connectivity around the premise can be difficult. Local Area Networks (LANs) may be used. Links to outside service providers are generally over diverse architectures.

The present invention contemplates a new and improved communication system that resolves the above-referenced difficulties and others.

SUMMARY OF THE INVENTION

The present invention is an enterprise information and communication system. The present invention comprises at least one database, a transaction management engine, an access management engine, an information-mining engine and an input control engine.

The transaction management engine manages bills, vouchers, purchases, and email notifications and moves information to and from the database helping to automate clerical work. The access management engine maintains security by holding records of at least one user and associates of the user and information to which the at least one user and associates have access and provides permission for accessing the at least one database. The information-mining engine sorts information within the at least one database, and finds information stored on remote devices. The input control engine access a database of device drivers for accepting and managing input from the user and output to the user through the a wide array of devices.

One advantage of the present invention is that it provides for integrating network and premise applications into a "Personal Space".

Another advantage of the present invention is that it provides for connectivity within the premise over wired or wireless links.

Another advantage of the present invention is that it provides for connectivity with outside service providers including broadband wired or wireless, cable, telephony and Internet.

Another advantage of the present invention is that it provides for communications management for the an enterprise, such as, for example a home including but not limited to conference calling, family or friend chat groups, faxes, messages, email, telephone and email directory and click to dial.

Another advantage of the present invention is that it provides for sending small or large amounts of information from service providers to a premise.

Another advantage of the present invention is that it provides for retrieving small or large amounts of information from the premise.

Another advantage of the present invention is that it provides for sending small or large amounts of information from premise located data devices or from a network service or information provider around the premise.

Another advantage of the present invention is that it provides for automatic negotiation for and accessing of bandwidth on demand on a premises or through networks.

Another advantage of the present invention is that it provides for processing information transparently behind the scenes and the automatic management of home information, and correspondence.

Another advantage of the present invention is that it provides for the automated provisioning of customized/personalized premise views and features.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 5 is a flow diagram of an exemplary application of the present invention.

DETAILED DESCRIPTION OF THE PREFERRED EMBODIMENTS

Figure 1:
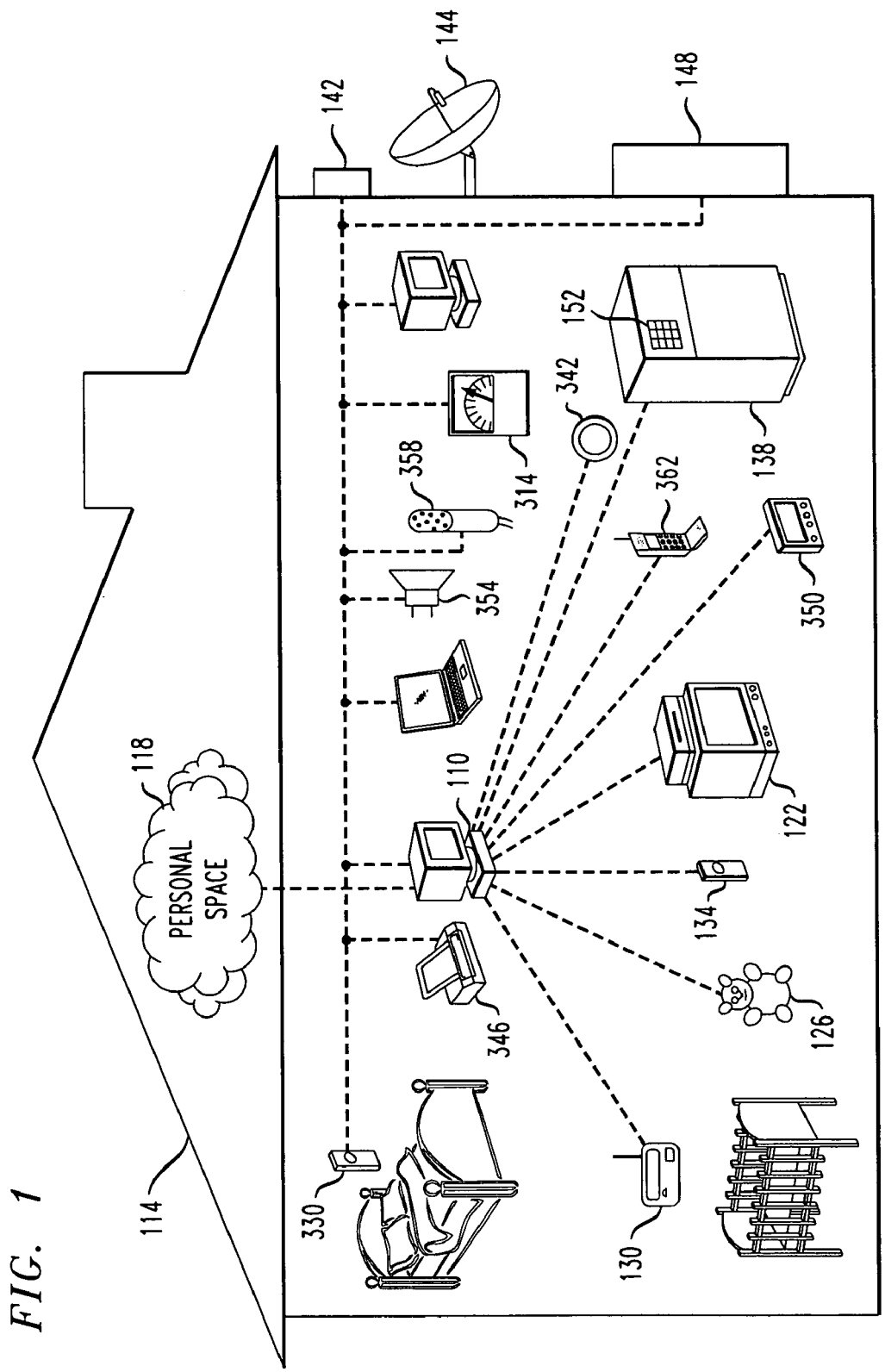
FIG. 1 is a schematic illustration of local physical elements of first use and configuration of an information and communication system.

In accordance with the present invention, consumers or businesses using the Personal Space experience a view of their premise, or premises. Several applications are integrated into a common interface view. Telephone book, messages, faxes, auto-dial list, conference rooms for virtual visits, Internet bookmarks, family chat groups, banking, bill paying, entertainment, pay-per-view, information services, and other features are all integrated into the Personal Space. The system resembles an Internet site or web application for the home or business. Personal information can be stored here including but not limited to family photographs and videos, diaries, homework, appointments, calendars, etc. For example, an integrated calendar includes configurable routines triggered at selected times, intervals, etc. Community interest features can be included such as community calendar, chat groups, etc. Transactions are conducted through a secure system. Provisioning of these personalized web sites uses templates with virtual architecture. Subscribed features are added. Connectivity is provided as features demand. A view of the home network appears in the web site with subscribed features and related available features. For example, a personal space service provider can use pull down menus and the like to display features that may be useful in a given context in order to encourage the user to select an item. Selecting an unconfigured item initiates provisioning.

Software applications can be used for stereo or entertainment systems or subsystems. By viewing a stereo or entertainment system graphical user interface on a web browser, a user can see all the elements in the premise that can be included in a stereo or entertainment system. Status of devices may be viewed. Devices may be configured using a standard configuration loaded into the software by a service provider or configuration manager. The devices are reconfigured using the graphical user interface, remote control, voice interface, etc. without requiring sophisticated work on the part of the user. The software is managing the elements of the entertainment center and maintaining management of memory, storage, speakers, monitors, and other resources to be used. Some of the elements used for the communications system, may also be used for the entertainment system. They are dynamically rearranged into a new system based on the software instructions. Software can be used for a cooking system. Recipe cards may be stored in Personal Space. A user selects items to be cooked using the web interface. Later the user goes to the kitchen and pushes a button on the microwave, triggering the connection and initiation of a session with Personal Space. Then there is a display shown on the microwave or other display device. The user can scroll through items and select a recipe card. When the user selects the functions on the recipe card, routines are triggered that activate the microwave, or other devices in the kitchen. Other routines that can be triggered include a series of timers that can be correlated to each other as part of a session. A session is managed by the Personal Space which tracks all elements of a session including ordering supplies, sending invitations, preparing food, serving food, etc. These elements may span days, weeks, etc. Or they may be simple sessions for a limited number of functions, such as cooking a prepackaged frozen meal in the microwave. Manufacturer's instructions can be accessed using the web interface, or a scanner, and can automatically provide control instructions to the microwave for power level and time of cooking, etc. Changes to or updates of data can be pushed to the user from the web. The changes can be found by the personalized search application. The search application looks for things on the web that relate to elements in the Personal Space of an individual. For recipes, the search application can be looking for ingredients manufacturers, sources, etc. Updates to information about ingredients or suppliers will be retrieved from the web and replaced in the Personal Space or introduced to the Personal Space. For example, a new lobster supplier sets up business on the web. User has a recipe for lobster bakes that is accessed often. The search application finds the lobster supplier and attaches it to the recipe for lobster bake (this can be done with a bookmark or page retrieval, or search listing). The user can review all the messages of this type that have been brought into the system.

Software applications can be used for communications packages: such a software application would have typical communications features built into it, including but not limited to answering machines, call waiting, caller id, sticky notes, bulletin boards, conference bridging, send business card, etc. These software features are accessed by the user through a web interface, or through the individual device connected to the system or subsystem.

The system has a timing element that understands complex timing issues. The system uses a method like a PERT chart or Gaant chart to determine relationships among items in a timeline. Once these relationships are determined, the software can use the time knowledge to coordinate interactions between the elements and the software using the elements. The messages sent to the kitchen, for example, would represent steps in a Gaant chart, each one in its sequence, timed appropriately, with multiple simultaneous timers tracking each step, each item cooking for its allotted time slot, and resource constraints. An announcement of "pre-heat oven for 350 degrees" will start a cooking session. The next announcement will happen when the oven reaches 350 degrees. An announcement to "put the frozen pie into the oven" will be heard. Fifty-five minutes elapses and another announcement is heard "check the pie in the oven." And so on. Each part of the feature is triggered by the timing elements.

The invention may be implemented in accordance with the teachings herein by way of a variety of hardware and software techniques, and should not be limited to any one configuration. Indeed, upon a reading of the disclosure, these techniques, as well as alternative such techniques, will be apparent to those skilled in the art.

Referring now to the drawings wherein the showings are for purposes of illustrating the preferred embodiments of the invention only and not for purposes of limiting same, FIG. 1 shows various components that can be included in an enterprise information and communication system. A central communications device 110 can be a personal computer. However, the central communications device can be a simpler device, such as, for example, a set-top box or "dumb terminal". The central communications device acts as a link between the people and devices within an enterprise 114 and a "Personal Space" 118 (shown in more detail in FIG. 2 and FIG. 3). Additionally, if the central communications device 110 is a personal computer, it also acts as a link between the Personal Space 118 and the outside world (not shown). Typically, the enterprise 114 is a home or dwelling. However, the enterprise can be a business, school, government office or any other location where an information and communication system would be useful.

The Personal Space 118 is a collection of databases, engines and agents that work together to collect and provide information to or about a user and a set of associates of the user. The Personal Space 118 can be implemented on the central communications device 110 if the central communications device is a personal computer. Alternatively, the Personal Space 118 can be implemented at a remote location on for example a mainframe computer or a network of file servers and maintained by a Personal Space subscription service provider. The personal space can also be implemented in a distributed computing environment.

In a display of the Personal Space 118, a selection of templates is created to provide a web site like view of the enterprise 114. For example, geographical metaphors may be used to depict places. Virtual house or enterprise views may be used to illustrate services and provide subscribers with access to features. A user can look for things such as features, bandwidth, other resources, in a comfortable user friendly audio/visual environment. Cable, broadband wireless, Internet, or telephony architectures provide links to service providers. LAN and PAN technology including wired home PNA or wireless provides links among devices within the premise. Subscribers or users can "find" things in their homes or offices in the Personal Space 118. The user can activate service features such as conference calling using the Personal Space 118 interface. The Personal Space 118 then initiates the conference feature locally or across a network. The user can initiate transactions with service provider architectures by activating, for example, a conference call. The user can receive services and data in a transparent mode through the connectivity established between network service providers and the Personal Space 118. The user can subscribe to these services on an ongoing basis, or select them on an ad hoc basis. The user can access these features from anywhere by logging into or accessing the Personal Space 118.

Preferably, the Personal Space 118 negotiates and makes provisions for the required connectivity without the intervention of the user. Through normal activities of the user, the Personal Space 118 determines, for example, bandwidth requirements, and determines the best available means to provision that bandwidth and automatically acquires the bandwidth. This provisioning preferably occurs in a manner that is transparent to the user. A service configuration database is used to determine what and how to set up new feature. The service configuration database can be stored locally to the Personal Space 118, at a service provider or split between the two.

Within the enterprise 114 are a plurality of devices that are used by the central communications device 110 in conjunction with the personal space 118 to keep track of and to monitor the user and associates of the user. For example, the central communications device can be tied via a local network 120 to a television 122, an electronic toy 126, a baby monitor 130, a patient monitor 134, a water gauge 314, a thermostat 342, a telephone 362, a security device 350, a printer 346 and a refrigerator 138. These devices include either wired or wireless network interface devices that are well know in the art. Additionally, the devices can include further enhancements that take advantage of the benefits of the invention. For example, the refrigerator 138 can include a refrigerator data pad and barcode reader 152. There is almost no limit to the kinds of devices that can be connected to the system. For example, displays 330, speakers or audio systems 354 and microphones 358 can also be included. Preferably, the local network 120 is a wireless network that can be reconfigured to provide features required for a given service. For example, speakers may be configured as part of a stereo system to play music. The speakers may also be used as part of a communication system when the family makes or receives a telephone call. The speakers are then part of a "virtual" telephone or speakerphone. When a user can see all these elements on a graphical user interface many tasks that ordinarily require a lot of steps or are cumbersome, become easy. For example, downloading music from a library of music to a car stereo. Additionally, the central communications device can be connected to the outside world (not shown) through one or more communications networks, such as, for example, a telephone line 142, satellite link 144, or cable modem connection 148.

When the user or associates of the user are not in the enterprise 114 they can connect to the personal space via a telephone, or computer network and query the personal space 118 as to activity within the enterprise 114. In this way, the user can draw conclusions as to status within the enterprise without having to disturb the activity within the enterprise. For example, by noting activity at the television 122, such as, for example, a channel setting and a volume level along with a time of day, the user may surmise that one or more children are in the enterprise. Additionally, by observing activity at the refrigerator 138, for example, a frequency with which or times at which a door of the refrigerator 138 has been opened, the user may surmise that someone is preparing a meal. By logging into the Personal Space 118, the user may also find messages left by associates of the user or by the Personal Space 118 itself. For example, the user may find a reminder to come home early, in time to eat dinner before a child's football game. The message can be left at a time that is convenient for the associate and retrieved at a time that is convenient for the user. In another example, an associate of the user uses a password or serialized wireless entry device such a s wireless key fob with a unique serial number associated with the associate, to gain entry to the premise. The Personal Space 118 updates whereabouts information associated with the associate. That information is viewable by the user from, for example a remote location. Additionally the premise entry initiates activities associated with the entry of the associate.

For example, messages are displayed on a refrigerator or other display or announced over entertainment system speakers or other devices.

Through the central communications device 110, the Personal Space 118 can locate and communicate with persons within the enterprise. For example, a phone call received through or monitored by the Personal Space 118 can be automatically routed to the refrigerator data pad 152 when there has been activity at the refrigerator near the time the phone call is received. Alternatively, the baby monitor 130 or the electronic toy 126 may be used as interfaces for the telephone call, when the most recently monitored activity in the enterprise was near, or included the use of those devices.

The central communications device 110 can also relay information from, for example, the patient monitor 134 to the Personal Space 118. The Personal Space 118 may simply log information from the patient monitor 134. However, the Personal Space 118 may include triggers or descriptions of threshold events for which specific actions should be taken. For example, if data from the monitor indicates that the patient is experiencing an arrhythmia, the personal space may issue an alert to a health care provider, emergency personnel, and/or the nearest associate or associates. The alert may take the form of any kind electronic message. For example, the alert may be in the form of a page, an e-mail, a phone call or an automatic upload of historical patient monitor information. Additionally, as with all enterprise status information, the alert can take the form of an icon or message posted on the web site type interface of the Personal Space 118. There, the alert is viewable by the user and associates of the user.

Figure 2:
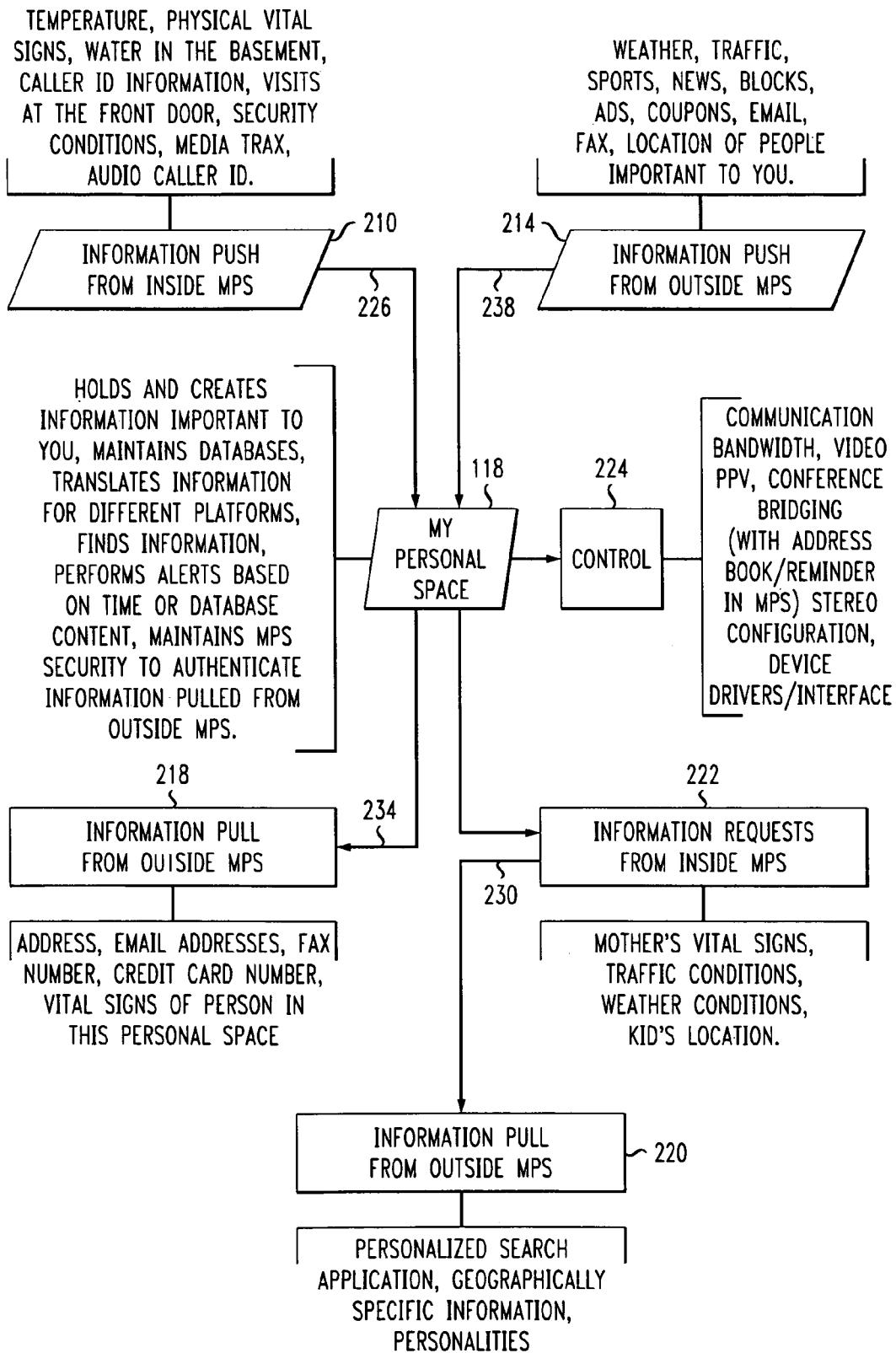
FIG. 2 is an overview of functions and functional elements of the information and communication system.

Referring to FIG. 2, a high level overview of functions of the Personal Space 118 includes an information push 210 from inside the Personal Space 118, an information push 214 from outside the Personal Space 118, an information pull a 218 from outside the Personal Space 118, and information requests 222 from inside the Personal Space 118. Resources, such as, for example, required bandwidth, to accommodate these pushes and pulls are negotiated for, and allocated by, an overall control 224.

Information pushes 210 from inside the Personal Space 118 send data to other systems, individuals and devices, outside the primary Personal Space. The alert regarding the patient's arrhythmia is an example of an information push 210 from inside the Personal Space 118.

Information pushes 214 from outside the Personal Space 118 are data that is sent to the Personal Space 118 by subscription, inquiry, request, etc. in real-time, scheduled, or ad hoc. Examples of information pushes 214 from outside the Personal Space 118 include news, weather, sports, business, local events, messages, locations of family members, and even home control services etc. For example, a home security subscriptions service may push a command causing the shut down and drainage water supply to a lawn sprinkling system do to the sudden approach of an ice storm. The push prevents the destruction of sprinkler system pipes. Even where this push service is not subscribed a security service can query personal space with an information pull 218 to find users with sprinkler systems and send complimentary warnings or commands in order to introduce the security service to potential customers.

Information pulls 218 from outside the Personal Space 118 are requests to send data about, from or for the user, to associates of the user that request the information. For example, the user may give permission for a merchant to access the user's Personal Space 118 to retrieve transaction information, such as shipping information, a credit card number and an expiration date, etc.

An information request 222 from inside Personal Space 118 is a request by the user for data on a scheduled, ad hoc, or real-time basis. Examples of such requests include requests for daily weather forecasts, web searches, and real time stock quotes. Information requests 222 from inside Personal Space 118 can initiate an information pull 220. When a user requests information not already stored within the Personal Space 118, the Personal Space 118 can pull the information from outside the Personal Space 118.

Information pushes 214 are generally the result of previous subscriptions. Information pulls 218 are generally the result of spur of the moment requests for information. For example, a boxing match may be accessed on a Pay Per View (PPV) basis. If the match is ordered well in advance of the event, then the match is pushed through the users personal space to, for example, the users television or home theater equipment. If, on the other hand, the user requests to view the boxing match just as the match is beginning, the match may be purchased and viewed as an information pull. In either case, the control 224 negotiates with bandwidth providers and allocates system resources in order to deliver the boxing match at the lowest cost, based on resource availability and user configured priorities. Configured priorities include, for example, indications of transactions that must me made at times certain, and transactions that can be postponed until bandwidth is available at a reduced cost.

Agents and engines within the Personal Space 118 work together to form information pushers 226, pullers 230, senders 234 and receivers 238. Preferably the pushers 226, pullers 230, senders 234 and receivers 238 are provisioned automatically and transparently to the user. For example, information is delivered to the user in the same manner whether it is located within the Personal Space 118 or had to be pulled from outside 220 the Personal Space 118. The user simply asks for the information. The user does not specifically ask that the information be pulled. A user can access an address book on a slim client. If an entry is not resident, the Personal Space searches the central communications device 110, then through a premises gateway to an information provider and retrieve the address, all transparently to the user. This process can also be established on an automatic or periodic basis to update and correct information stored locally.

Figure 3:
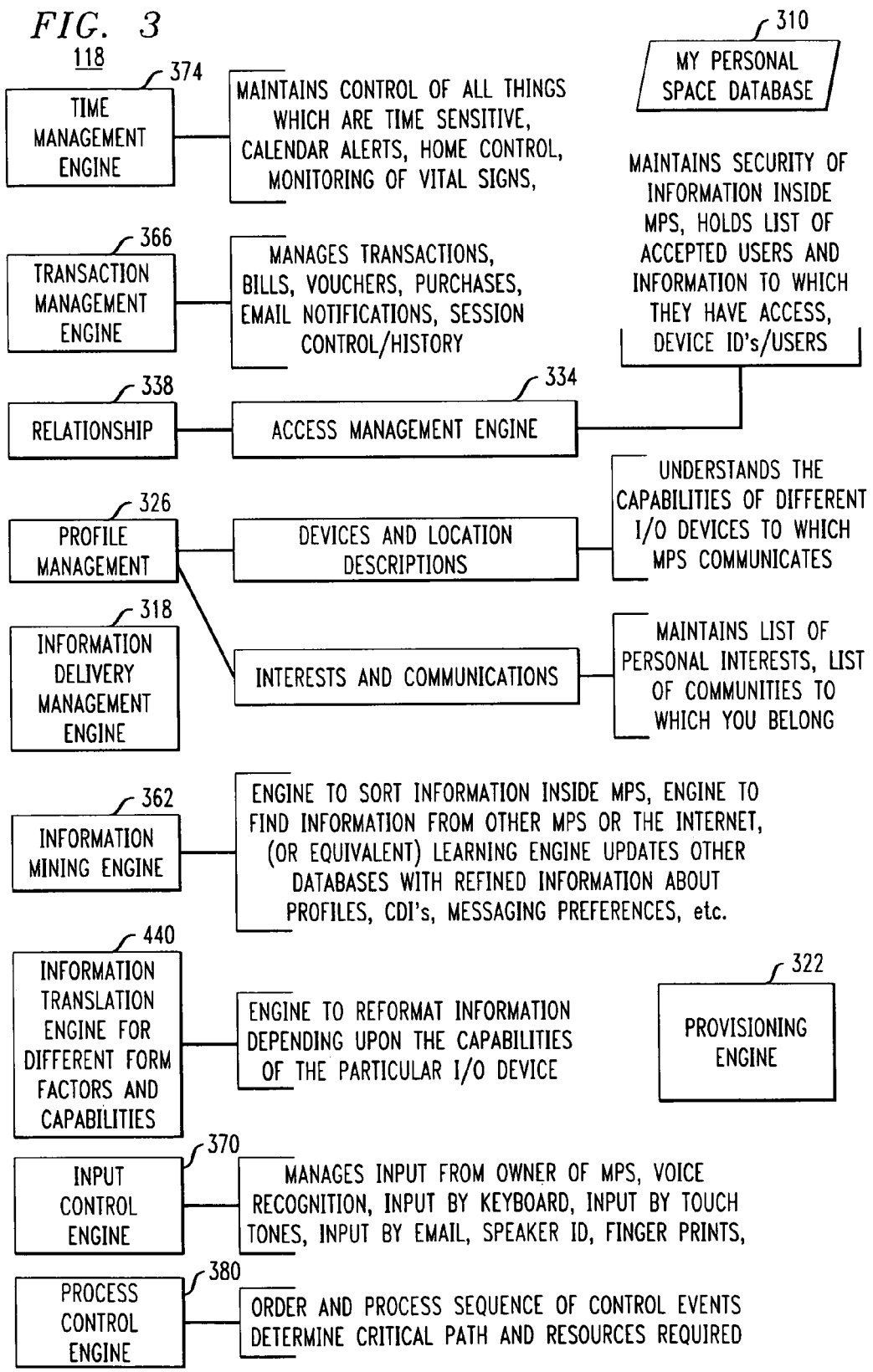
FIG. 3 is a more detailed view of the functional elements of the information and communication system.

Having thus described the information and communications system in general terms, the information and communications system will now be described in greater detail. With reference to FIG. 3 and as outlined above, a function of the information and communications system is to exchange information with other devices or systems and individuals inside and outside the Personal Space 118.

The Personal Space 118 can be implemented in wide variety of ways. Personal Space 118 functions can be distributed over any number of sub-processes. In one embodiment, the Personal Space 118 functions are divided up and made the responsibilities of a time management engine 374, a personal space database 310, a transaction management engine 366, an access management engine 334, a relationship database 338, a profile manager 326, an information delivery management engine 318, an information mining engine 362, a provisioning engine 322, an input control engine 370, a process control engine 380 and an information translation engine 440.

The time management engine 374 is a software component running on a processor which maintains time and a list of events to be triggered by time. At the appropriate time, these events (requests, alerts etc.) are launched by the time management engine. The time management engine 374 maintains control over all time sensitive events, data and tasks. The time management engine 374 knows about critical path, events, conflicts, resources, timers, etc. The timing management engine 374 of the system tracks elements whose relationships are conditioned by temporal events. A calendar, for example, has many entries. Some of the entries are private, some are public, some are work related, some are personal, some are negotiable with outside entities. An example of how this negotiation would take place is: a person calls the doctor's office to set up an appointment. The office is closed. The person interacts with the Personal Space of the doctor's office. The Personal Space identifies available time on the calendar when the doctor will accept appointments, and presents the caller with options. The caller can then select a time. The access management engine 334 has checked that permissions are granted for such a transaction, the time slot is of a type that can be updated by this user, and the system negotiates for an slot of time to be blocked in the calendar.

The transaction management engine 366 is a software component running on a processor, which maintains and executes employing format and address information in the database. The format and address information is unique for each of the entities the Personal Space 118 transacts with. For example, an IP address and packet format to send electronic bill pay information to a user's phone service provider would reside together with the address and ID login information for an associates Personal Space. The transaction management engine 366 manages transaction items, such as, for example, purchases, bills, vouchers and email notifications. The transaction management engine automates tedious clerical tasks. For example, having been configured through the services of the provisioning engine 322, the transaction management engine 366 monitors email traffic in anticipation of the arrival of a credit card bill. When the credit card bill arrives the transaction management engine 366 correlates the items on the bill with events logged in a calendar of the user. For example, items charged while the user is scheduled to be on a business trip are noted and logged in a spreadsheet as business expenses. At least portions of a business expense voucher are automatically prepared for the user. The user can group items together using an interface and identify them as items in a transaction. Templates can be established to simplify the process.

The transaction manager 366 connects entities such as messages, people, calendars, etc. into a sequence that represents a known transaction for the user. The transaction manager 366 has the ability to track sessions. The sessions can be correlated with one another even across different architectural devices, by establishing a record with the Personal Space. The transaction manager 366 can use configuration management techniques to "complete" a view of a transaction, a session, elements, etc. In this manner, a user can view transactions that are not yet complete as if they are completed to some degree. The user can select an element in a transaction and update it. Messages received by the system can be labeled to identify them as belonging to one or more transaction, or one or more transaction type. The relationship database 310 is established in Personal Space to, among other things maintain a record of these relationships.

The access management engine 334 is a gatekeeper. The access management engine 334 is a software component running on a processor which maintains and controls access to the information in the Personal Space Database 310. User information and verification of identity information is maintained on the Personal Space 118 together with a table of Personal Space 118 information which the particular users are allowed access. The access management engine 334 maintains the security of information inside the Personal Space 118. It uses the relationship database 338 to maintain records of security information such as the identities, wireless key fob codes, passwords and access limits for the user and associates of the user.

The profile manager 326 is part of the Personal Space Database 310, which maintains the capabilities of the I/O devices which have been predetermined to be supported for interaction with the Personal Space 118. The information maintained by the profile manager 326 is accessed by the input control engine 370 and information translation engine 440 to present and receive information from users. The profile manager 326 is also part of the Personal Space Database 310, which maintains personal interests and groups which are unique to the owner of the Personal Space 118. These interests are dynamic and are fed by information obtained by observing the requests made on the user's behalf by the Information Mining Engine 362. The profile manager 326 records and disseminates information about the devices connected to the system and the people who access the system. The profile manager 326 understands the capabilities and limitations of system components and it learns the interests and characteristics of the system users. Generic profiles can be used by the system. A user can select a generic profile as a starting point and customize it by filling in information relating to interests, etc. The system then observes the users activities and learns from each transaction, modifying the interface or offering new features that compliment the users personality and or lifestyle. For example, the system learns that a first user selects conference call often. The service provider has extra conferencing features available and so the system changes the personal space in order to highlight those features and offer the user information about subscribing to those features.

The information delivery management engine 318 is a software component running on a processor, which manages regular information flow to the database 310. The information delivery management engine 318 accepts timing alerts from the Time Management engine 374, accesses required information from the Transaction Management Engine 366, and then sends/receives information from the Information Mining Engine 362, and then restores the requested information to the database 310, directs information and communication traffic. The information delivery management engine 318 accesses the personal space database 310 to determine how and where to deliver messages and control signals within the personal space, throughout the information and communication system and to and from connected communications networks.

The information-mining engine 362 is a software component running on a processor, which can sort information on the Personal Space Database 310 as well as work with interfaces with other databases and information sources (such as the Internet) to obtain information. Information received by the Mining Engine 362 is sorted and used to populate a Profile Manager/Interests portion of the database. The information mining engine 362 searches for information both inside and outside the Personal Space 118. The information-mining engine 362 delivers information to and from the personal space database 310 and collects information about and provides information to the user and associates of the user. Information mining is a way to personalize information requests in an area in which the user is interested. Furthermore, information mining is a way for users to find each other, experts, people with similar interests, etc.

The provisioning engine 322 is a software component running on a processor together with hardware components controlling the bandwidth into a user's environment. Requests can come from the user to, for example, to provision a phone call to a person identified using numbers stored in the address book, employ multiple lines to a site or bridging in a telephony network to enable 3-way calling. Requests can come from the Information Mining Engine 362 to provide access to the Internet over primary and backup connectivity methods. The provisioning engine 322 collects system configuration information during for example a system commissioning. For example, the provisioning engine determines the number and types of devices in an enterprise that are in communication with the Personal Space 118. The provisioning engine provides for the configuration of the various devices. For example, the temperature set point of a thermostat is configured through the provisioning engine. Additionally, the temperatures at which alarm messages are to be sent are also configured through the services of the provisioning engine 322. For instance, if the temperature of the enterprise drops below a certain point, the personal space is configured to assume there is a malfunction in the heating system of the enterprise and the user is paged and a work order is sent to a heating contractor. The services of the provisioning engine 322 are used to set the set point and the alarm temperature.

The process control engine 380 is a software component running on a processor, which serves as the central information router in the Personal Space 118. Requests from the user are interpreted in software and then actions are launched in response. Order and sequence of operations is determined and used to control events. Resources required to enable requests are determined. Information obtained can be used to populate events scheduled for the future by communication with the Time Management Engine 374, or used immediately with the Profile Manager 326, Access Manager 334, and Information Mining Engines 362. The process control engine 380 automatically negotiates for, and allocates system resources, such as, for example, communications bandwidth. Furthermore, by periodic query, or subscribed notifications the process control engine 380 keeps track of and manages software updates and database up dates such as device profile database updates.

In this embodiment, the process control engine 380, together with other engines, such as, for example, the information delivery engine 318 and the time management engine 374 forms a large part of the control 224.

The information translation engine 440 is a software component running on a processor which accepts information describing the profile of a device to which information is being sent, and then, using this profile, modifies the information to be presented in the most advantageous manner as described by the profile. The information translation engine 440 translates or reformats information based on the capabilities of devices the information is targeted for. The profile manager 326 provides the information translation engine 440 with a description of the capabilities of the targeted devices. Service discovery and other communication known in the art may be used to determine functionality available in a particular device, and therefore, what the virtual system is capable of doing.

The input control engine 370 is a software component running on a processor which accepts information describing a profile of the device from which information is being sent, and then, using this profile, interprets the information appropriately. This could include information from humans interpreted using voice recognition or pen input or information from external devices such as Caller ID boxes or Set top boxes. The input control engine 370 accommodates output devices and accepts input from the user through a wide variety of devices, including, but not limited to, voice recognition systems, keyboards, media embedded and/or encoded messages, telephone touch-tones and via fax and email. Encoded messages instruct the central communications device 110 to identify a resource and relay a message, activate a function or feature, or provide connectivity. To disambiguate multiple devices identified to provide the same service, the Personal Space presents the user with a menu of choices. The input control engine 370 maintains or provisions access to a database of Personal Space 118 compatible devices and device drivers. The input control engine 370 filters and adjusts data in order to present what information is possible based on the input/output device the user is using. For example, if the personal space is knows the user currently has access to a video display terminal, the Personal Space 118, may, through the services of the input control engine 370, present a full report on the low temperature alarm, including, for example, the time, the current temperature, a graph showing the temperature for the last 12 hours and the time the heating contractor is expected. On the other hand, if personal space can only contact the user through a pager, the input control engine 370 reduces the report to a short generic alarm message and coded request. The coded request is, for example, that the user check-in to the Personal Space 118 through a more capable device, for example, a telephone. These items and entries may be managed by the Personal Space a messages of a particular type. They may be filed, stored, categorized, prioritized, resent, etc., based on the users preference, associates recommendation or subscription type. When the user phones the Personal Space 118, telephone device drivers accessed by the input control engine 370 allow the personal space 118 to report the problem using an artificial voice. Additionally, voice recognition software allows the users to direct the personal space to reschedule the heating contractor for a time when the user will be home. It is possible for the user to access a trained speech recognition engine by using a personal identification number or other such password.

A typical application using the Personal Space 118 architecture and system elements of FIGS. 1-3 is a health monitoring application. A device or collection of devices may be monitoring vital signs of a heart patient in the home, hospital, office, or other location. The user of Personal Space may have a heart monitor gathering data about the function of an individual's heart rate and function. The data gathered is uploaded to the personal space database 310.

Through services of the Personal Space 118, the database 310 is connected to a communications system including, for example, the Internet. The data is moved from the local database 310 to, for example, a device that is connected to, for example, the Internet, where it may be processed using an enhanced application (not shown) to determine the significance of the current reading. The significance may be determined based on the readings relationship to the past readings, to thresholds settings and/or exception handling, determined through intelligent analysis, by review of a live medical professional, or by other means.

The user can authorize delivery of this information to, for example, a medical system, medical professional, or a family member. The information will be presented to the selected person either as a report, a message, or through, for example, an icon or other metaphor that is access when the selected person browses the Personal Space 118. The information can be presented to a local application for other purposes. For example, a relative sitting in a living room while a baby naps in another room can see virtual signs on a display, or hear an audible signal if there is a problem.

In one configuration, the patient has a first Personal Space. The patient's son has a second Personal Space. The patient can authorize the son to view the status of the heart monitor. The Personal Space can adapt the interface, and present reports and messages in a manner that is most useful for the user. For example, the son can customize his Personal Space to present all of or only a small portion of the mothers health information. For example, while his personal space receives all of his mothers health information for archival purposes, the son configures his personal space to only show health alert information.

In another configuration, the patient has a Personal Space but a physician of the patient does not have a Personal Space. The patient can authorize a report of heart function to be sent to the physician, or a health care entity via e-mail, fax or other means.

In another application of the information and communications system, devices (including those already mentioned and others) around an enterprise or home 114 are equipped with wired or wireless connectivity to a central communications device 110, which in turn is connected to a communications network such as the Internet, cable plant, or wired or wireless telephone network. These connections are accomplished through, for example, the telephone line or fixed wireless loop 142, the satellite link 144, or the cable modem connection 148.

The user may have a sensor, such as, for example, the water gauge 314 attached to a sump pump (not shown) in, for example, a basement. The water gauge can be connected to the information and communications system by wired or wireless means. If a water level threshold is exceeded, a communication is delivered from the water gauge 314 to the central communications device 110. The central communications device 110 sends the message to the Personal Space 118 for processing by the appropriate agent or engine. For example, the message may be processed by the information delivery management engine 318. The message is then sent according to provisioned preferences stored within the personal space database 310 to an emergency service bureau, or to an owner of the enterprise 114, or to some other agent of the owner. In one scenario, the sensor sends a request for resources via the LAN or PAN to the Personal Space. The Personal Space negotiates for and/or allocates the required resources and connectivity for a session is established and the appropriate messages are sent. When the user accesses a connected device, for example a microwave oven, connectivity with the Personal Space is automatically established and the sump pump message is displayed. Alternatively, under non-emergency situations, the user selects a recipe card at the microwave display and the Personal Space displays cooking instructions.

In general terms, in the scenario described above, a flood is detected by a device, and the information and communications system moves the data to a communication access point in the premise, then information is transmitted through a communications network and is delivered as a message about the flood to an appropriate person or persons.

A variety of communication messages may be triggered by an event such as a threshold exceeded. A list of messages is maintained by the Personal Space. A profile is provisioned and indicates message treatment for the system when events have occurred.

A profile is provisioned by a provisioning engine 322 during a system commissioning or system reconfiguration period. Provisioning can include defining alarm or messaging events along with alternate points of contact for events. Additionally, the provisioning engine 322 can allocate and negotiate for resources. For example, the provisioning engine can allocate and negotiate for communications bandwidth based on configured task priorities. For example, a phone conversation may have priority over a routine sport score data pull or reception.

Communication message types are provisioned in a profile with the assistance of a profile manager 326 or as part of a feature set of a Personal Space 118. Examples of communication message types include but are not limited to: pages, phone calls, Internet messages, Internet phone calls, remote alarm triggers, event log uploads, logged data uploads, etc. Store and forward services are simplified by the architecture of the Personal Space. When a display device, such as, for example, a lap top computer, is not within range of the Personal Space 118, the message is stored and delivered at a later date. Messages are also stored for later delivery when a targeted device is "busy" as well. Event messages are also tracked by the Personal Space 118, including device-to-device messages of certain types. Once a device is "discovered" or reacquired by the system it appears on the graphical user interface display of the system or subsystem of the home, enterprise etc. until it is once again removed. Its status is also displayed. If the device is available for use, its icon appears in a different form, for example a color of the icon is changed. When the device is once again moved out of range, or if the device becomes busy, the icon display changes again to indicate the devices new status. Alternatively a status message is displayed next to the icon.

As outlined above, information from various servers and sources around a network can be transmitted to the Personal Space 118 user based upon a variety of profile attributes, features, subscriptions, communities of interest, etc.

A user may wish to know every morning what the weather will be like so that children can be dressed properly. A provisioned profile set up through a profile manager 326 and stored for example in the personal space database 310 can indicate which services and features the user has subscribed to, or which data should be delivered and with what frequency. Alternatively, an application on an external network may also contain parameters defining content to be delivered and with what frequency. This data can be modified automatically through a Personal Space personalization process; a process of learning what the user preferences are and can be triggered to identify services and features for upselling the user.

When the user wakes up each morning a message can be sent to a Personal Space of the user. The message is passed to a device or devices most likely to be useful in the circumstance. In this case, a wireless device is linked through the central communications device 110 to the Personal Space 118 that has received information from an outside source. For example, information has been pushed or pulled by or from an information provider.

The data, in this case weather information, can be displayed on a wireless display, for example, the display 330 (see FIG. 1) on a nightstand (not shown) in a bedroom. The wireless display device may have several interactive features associated with it including but not limited to, for example, scrolling, selection of details or items from a menu, a speech interface, and/or audio output.

In the case of information being delivered into the Personal Space 118, a profile, which has some provisioned and some dynamically obtained elements establishes a number of important attributes about the data and means to be delivered including but not limited to: a geographic location of the user; services and information interests of the user; demographic information about the user; community of interests; a target device for the delivery of the information; and a preferred interface for communicating with the user. Other information that can be delivered in this fashion includes, for example sports, traffic, and business news, entertainment, schedules of upcoming events, location of family members and more.

The user can receive information on a scheduled or ad hoc basis from any number of sources and can specify that the information be delivered to various target devices. The profile may specify a target device for a particular information type. For example, a message indicator or list may be displayed on a screen on the phone or computer. Therefore, the data should be transferred to that device at all times.

Alternatively, a device itself can send a request for certain kinds of information to the central communication device 110. The request by a device may be, for example, be the result of an inquiry by the user within the premise. A display may contain a menu of available information services. The user may select the desired item from a menu. The selection of the item can trigger a request to the central communication device 110 to in turn request information from the Personal Space 118. For example, a button is pushed on a refrigerator display device to request a menu of options. A selection is made and information, such as, for example, a list of new messages is displayed. When the agents and engines of the Personal Space 118 retrieve the information, it is directed through the central communication device 110 to the provisioned target device. In this manner, information may be transferred from a centralized processor to the device upon which the user wishes to receive the information.

Preferred embodiments of the invention operate in a seamless or transparent manner, requiring no direct action by the user. For example, a message transaction can occur automatically when a device moves to within range of the central communication device 110. A device can send a request to the central communication device 110 in an automated fashion. For example, when a user returns home with a palm top computer, the palm top can detect the base station or central communication device 110 within the premise, and can request that any updated information stored in the Personal Space 118 be sent to it. The unit may continue to communicate with the central communication device 110 for a number of applications as long as it is within range of the unit or connected by other means.

In a similar manner, mobile devices may be connected from time to time to a network element. For example, a cell phone, associated with the user or an associate of the user, equipped with a global positioning system receiver may, based on a request, profile setting, or based upon application features may check-in to the Personal Space 118 and report the cell phones location and or status. The user and associates of the user may then observe the location, condition, and status of many mobile elements through the viewing of the Personal Space 118.

In this way, the user can find and check up on a child or other family member using the Personal Space 118 without disturbing them. The information and communication system keeps track of the devices being used by family members, again preferably seamlessly and transparently, periodically updating location information. Alternately, a request may be sent to the information and communication system to locate a person who may be in possession of a device provisioned to the Personal Space 118.

There are several types of devices that may be used to connect a person to the information and communication system including but not limited to: a web phone, a cell phone, a browser, a pager, a palm top, a computer, wireless display, voice interface, adjunct box, modified appliances, sensors, cars, etc.

Outsiders from the Personal Space may pull credit card, ship to, and other data. The data that may be pulled may include information for transactions, queries for subscriber, interest in special events, products, services, etc., utility telemetry and meter reading applications, maintenance queries for appliances, automatic polling, requests for data to determine communities of interest, and consumer product usage data. These features have security associated with them. Through further services of the provisioning engine 322, the access management engine 334 can establish and maintain the relationship database 338. The relationship database 338 includes entries for associates of the user, including individuals and organizations that the user wishes to grant access to portions of the Personal Space 118. The relationship database 338 includes entries that describe the portions of the Personal Space 118 each associate may have access to, as well as any passwords, encryption methods and similar security information associated with each associate. When information pulls 218 from outside the information and communication system are requested the access management engine 334 consults the relationship database 338 and oversees the pull transaction, granting access only to the information the requestor is authorized to retrieve.

In yet another application of the information and communications system, the user may wish to check, for example, a temperature within the enterprise 114 while the user is away from the enterprise 114. The user may access the Personal Space 118 and view the temperature information from outside the enterprise using a web device, telephone, web cell phone or other communications device. Once a connection to the Personal Space 118 is established, information from devices connected via wired or wireless means around the enterprise 114 may be viewed and devices may be queried. If the user wishes to adjust, for example, the temperature, he or she may use an interface, for example, a speech or graphical user interface to communicate instructions to the Personal Space 118, to effect a change to the settings on, for example, a thermostat 342. The instructions will be sent from the central communication device 110 at the premise to the thermostat 342 either through wired or wireless means, through control means or speech control.

As mentioned, the user may access the system from a remote location via any communication device. For example the user can communicate with the Personal Space 118 via web devices, cell, digital and POTS phones, and ship to shore radio (not shown). Once connected, the user can use the Personal Space 118 to check on or adjust any or all of the devices connected to the central communication device 110. The central communication device 110 may comprise one or more sub-devices arranged as the central communication device 110 for the purposes of connecting elements within the enterprise 114 with one or more communications network elements outside the enterprise 114

Information requests 222 from inside of Personal Space 118 can generate personalized information pulls. Attributes about the user are maintained by an information mining engine 362 so that requests for information, whether scheduled, ad hoc, or specific manual inquiries may be enhanced with a history of the user and knowledge of his or her specific situation. Preferably, through transaction observations made in co-operation with the transaction management engine 366, the user is assigned to a community of interest. In this regard, for example, a method has been described in co-pending application Ser. No. 09/428,031, filed Oct. 27, 1999 by Shriver and Small, and entitled METHOD FOR IMPROVING WEB SEARCHING PERFORMANCE USING COMMUNITY-BASED FILTERING, which is hereby incorporated by reference. Alternatively, the user may make manual interest selections. The community of interest information is used to enhance any search performed by the information-mining engine 362. In this regard, a preferred such search engine is described in co-pending application Ser. No. 09/654,335, filed on the same date hereof, by August et al. and entitled SYSTEM AND METHOD FOR PROVIDING INTERACTIVE DIALOGUE AND INTEREACTIVE SEARCH FUNCTIONS TO FIND INFORMATION, which is hereby incorporated herein by reference. The subscriber can request such searches either passively, as a part of another feature or function, or actively. Since people with similar backgrounds or professions tend to select the same items from a list of search hits found by a search engine, characteristics of the subscriber are maintained by the profile manager 326 and actively used by the information-mining engine 362 to perform searches. By comparing the users attributes with attributes of users of other Personal Spaces, the information-mining engine 362 can prioritize search results based on the preferences of other users with similar attributes. The information-mining engine 362 can gain access to the attributes and preferences of the users of other personal spaces through transactions with a personal space host system (not shown). The information-mining engine 362 may perform searches as part of a transaction, or as discrete searches. The searches may be fixed and occur in one place, or the searches may occur across devices or locations. The searches may have some elements that are unknown at the time the search is initiated. Therefore, a configuration management approach is used to conduct searches where some variables are missing, and can be added when known. The elements of search selection criteria for user-initiated searches can be displayed in a graphical format and may be modified at any node by the user. The user communicates with the Personal Space through the services of the input control engine 370. The input control engine 370 maintains an inventory of device drivers and so, can accept input from the user from a large array of devices including, for example audio devices through voice recognition, telephone touch tones through menu presentation and selection, and text based command acceptance via email or ordinary keyboard based commands.

There may be elements of the search that depend upon the community of interest of the user. For example, members of a community of interest often select the same items from a listing of search results. The information mining engine 362 in conjunction with the profile manager 326 will know characteristics of the users and will associate the users with known communities of interest so as to prioritize displayed sources during searches so that sources that have been selected by others in the same community of interest as the user are easy to find.

Figure 4:
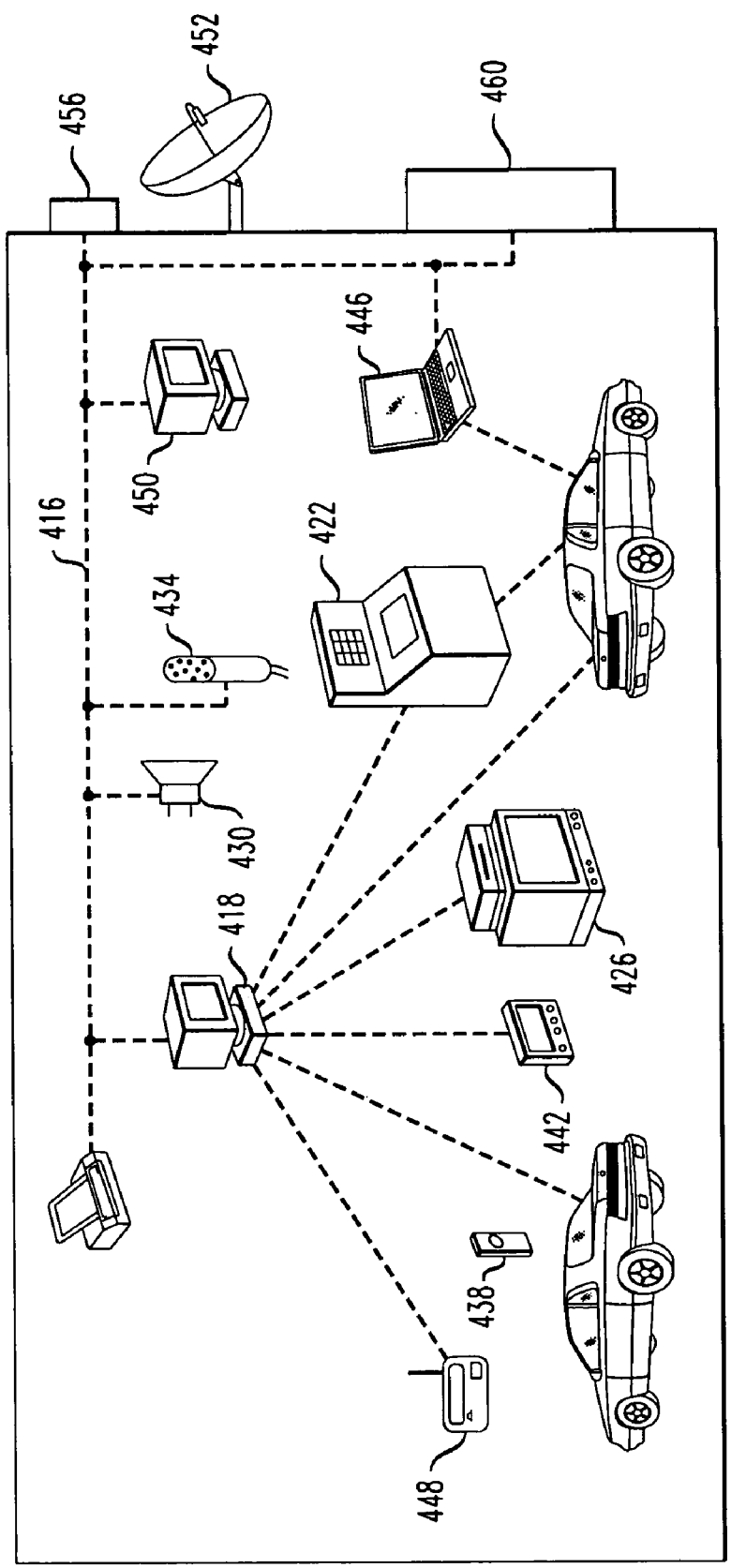
FIG. 4 is a schematic illustration of local physical elements of second use and configuration of an information and communication system.

Referring to FIG. 4, another configuration of the information and communications system and Personal Space 118 is used in a customer service application. For example, an enterprise 414, such as, for example, a car dealership may subscribe to a Personal Space 118 service. The car dealership can grant access to the Personal Space 118 to potential customers. Employees of the enterprise 414 or dealership are super-users of the Personal Space 118. The potential customers are associates of the dealership or guest users of the Personal Space 118. The potential customers can interact with the Personal Space 118 by using their own personal computers and cell phones, etc. as well as by using network devices connected to an enterprise network 416 at the enterprise 414 which in this example is a dealership premises. At the heart of the enterprise network is a central communications device 418. The central communications device 418 connects other network elements to the Personal Space 118. At the enterprise 414 or dealership the potential customers can interact with the Personal Space 118 through, for example, interactive kiosks 422, passive presentation devices 426, audio output devices 430, microphones 434 web provisioning and other devices.

The potential customer can view many pieces of information in multimedia format through the Personal Space 118 of the dealer.

When a potential customer is granted access to the Personal Space 118 the profile manager 326 begins building a profile for the potential customer. The profile of the potential customer can contain demographic information that is solicited from the potential customer. Additional information can be added to the profile of the potential customer based on the browsing patterns and items selected within the Personal Space 118. The system can push data targeted to the customer type (COI) and can request information pulls from online sources containing information about the customer. The session and transaction are managed by the system. The demographic information can include, for example, driving and buying history and financial history information.

In addition to the potential customer profile, a transaction is also initiated. The transaction manager 366 opens a transaction for the potential customer. The transaction can take place over an extended period of time. For example, the transaction can be open for a number of weeks while the potential customer is inquiring about cars, features, etc. The transaction can include a variety of items. For example, a transaction can include a constantly updated purchase order or set of purchase orders detailing the costs and options of various cars the potential customer expresses interest in. Additionally, with the assistance of the information-mining engine 362, the transaction can included financing and insurance quote information for each of the various cars of interest.

Of course, initially there is some degree of uncertainty about the transaction and the elements of the transaction. History and decision points are maintained by the system and may be modified to effect a change in the ultimate transaction. Each decision point is represented as a node on a decision tree. At each node, the potential customer can back up and make a modification to a decision.

Preferably, most interaction with the Personal Space is transparent to the potential customer. Where necessary, an employee of the enterprise can drive the application for the consumer. For example, through the services of an information translation engine 440 (see FIG. 3), the Personal Space 118 may be presented in a slimmer less multimedia rich manner, on, for example, a web cell phone 438, palm top 442, wireless enabled laptop 446 or an onboard system of the car, while the customer is test driving a car or while the potential customer is walking around the dealer's lot. The enterprise employee can, for example, use the palm top 442 or laptop 446 to enter option preferences, such as, for example, a CD player that the potential customer mentions during the test ride. Additionally, the enterprise employee can use the Personal Space 118 to notify other employees that the customer would, for example, like to test-drive a similar vehicle with a different suspension package, or with an engine upgrade. The other employees can then have the next test vehicle ready at the conclusion of the test drive.

During the test drive, the Personal Space 118 can provide other services and advantages. For example, the information-mining engine 362 can relay traffic information accessed, for example, with an information pull, via a computer network, to the test drive vehicle via the palm top 442 or laptop 446 or onboard system. Additionally, the profile manager 326 can recommend test drive routes that have been involved in positive purchase decisions of similar customers. Alternatively the profile manager 326 can suggest routes to avoid, because customers similar to the potential customer have not purchased similar vehicles after driving those routes. Furthermore, the profile manager 326 can suggest radio stations to be played during the test drive based on the music that similar customers were listening to prior to making a purchase.

Preferably, the profile information referred to above is collected through the use of networked sensors or onboard systems in the test vehicles and at the point of sale. Data mining techniques can be applied to collected information. Known data mining techniques can uncover information and relationships that are not apparent to human observers. For example, a global positioning system module 448 mounted in test drive vehicles or installed in test drive palm tops can report the routes taken-during test drives. Similarly, sales reporting terminals 450 at the enterprise 414 indicate to the Personal Space 118, that a sale has been made.

Potential customers can view pictures and multimedia presentations of vehicles, view personalized loan information, insurance information, and make a buying decisions using the system from remote locations or at the enterprise. Information about the specific cars tested can be automatically entered into the Personal Space 118. Elements around the dealership are connected to the centralized communications device 418 using wired and wireless connectivity. For example, car in the dealership inventory are connected to the system via on boards systems. In turn the central communications device 418 is connected to the outside world through typical means such as satellite links 452, wired and/or wireless telephony 456, and cable networks 460.

As described above, a potential customer can be connected through a Personal Space 118 gateway to multiple sources of loan products, insurance products, or other items as the car dealer authorizes. These sources live in multiple web sites across a network.

The personal information and credit information about a potential customer may be made available to the dealer through the network and retrieved by the information mining engine 362 as a part of a service or by permission of the customer.

Once a purchasing decision has been made, the shopper may access government and insurance agencies and initiate a transaction to register and insure the car.

Dynamic inventory management of the automobiles, loans, and other items needed for the transaction may be accomplished through the Personal Space 118. In this way, automobile manufacturers, dealers, etc. may leverage their Internet presence within the physical plant of the dealerships as well as home computer users. More salient information is known about the inventory requirements, and cars may be delivered closer to the time of purchase by knowing more about the inquiry patterns of customers. Real time inventory management may be accomplished. Marketing strategies may be created using information from searches conducted in the showroom and online outside the enterprise 414 by customers. Communities of interest (COI) can be developed to better understand the purchasing habits and needs of selected customer segments. These COI's will have fine granularity due to the nature and timeliness of the data made available.

The transaction management engine 366 can create vouchers and maintaining a continually updated ledger.

Preferably, the Personal Space 118 and it's sub-component agents, engines and managers, such as, for example, the time management engine 374, transaction management engine 366, access management engine 334, profile manager 326, information delivery management engine 318, information mining engine 362, information translation engine 440 and input control engine 370 are implemented in software. They can be stored in a computer bulk storage device such as, for example a disk drive, and loaded into a computer memory when needed. Additionally, databases that are part of the Personal Space 118 such as, for example, the main personal space database 310 and the relationship database 338 are typically stored on a computer bulk storage device such as, for example a disk drive, and loaded into a computer memory when needed. Processing resources and storage resources can be located and used by the Personal Space for each application.

Along these lines, it is to be appreciated that the control or flow experienced by the software modules utilized will vary depending on the application. However, a description of the flow through the system of the present invention in the exemplary application of an address book look-up is representative of other such flows in the system. Any appropriate and/or necessary variations in the flow—to accommodate other applications as contemplated by the present invention—will be apparent to those of ordinary skill in the art with a firm understanding of the present invention as described herein.

More particularly, referring to FIG. 5, a flow 500 relating to an address book look-up procedure is illustrated. It is to be understood that this representative application of an address look-up procedure implicates an input device 502 (which could be any suitable input device), the input control engine 370, the information translation engine 440, the access management engine 334, and the information mining engine 362. The database 310 is also utilized, as well as an internet address locator. Of course, the configuration will vary depending on the application.

To accomplish an address book look-up, a user requests access through an input device (step 504). The input control engine 370 then manages and maintains the input (step 506). The access management engine 334 requests verification of the identity of the user (step 508). The information translation engine 440 subsequently manages the output of the engine 334 (step 510). The input device responds to the engine 440 with a verification response (step 512). Once this is accomplished, the input control engine 370 manages and maintains the input (step 514) so that the access management engine 334 can check the database 310 for identity of the user (step 516). A determination is then made by the access management engine 334 as to whether the user is verified (step 518). If not, a rejection notice is sent (step 520) to the information translation engine 440, which in turn manages such output by forwarding the notice to the input device (step 522). If the identity of the user is verified, the translation engine 440 likewise manages that output by sending the verification to the input device (step 524). A street address for a local pizza parlor (or any appropriate address) is then requested by the input device 502 (step 526). The input control engine manages this information (step 528) by having the system determine if the requested address is already stored within the Personal Space by checking the database 310 (step 530). This, of course, leads to a determination of whether the address is so located (step 532). If the address is located within the database, the information translation engine 440 manages this output (step 534) by forwarding the information on to the input device 502 (step 536). If the requested address is not located on the personal space, the system searches for it using the information mining engine 362. In this regard, the address is sent to the information mining engine (step 538). A request is subsequently made for an internet search (step 540). At this point, an internet address locator, located outside of the mining engine, is implemented (step 542). The retrieved information is received and verified by the information mining engine (step 544). The address information is sent to the user and a cache memory within the Personal Space or the database 310 (step 516). To reach the user, the information is funneled through the information translation engine 440 (step 548) before being returned to the user (step 550).

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

The invention claimed is:

1. An enterprise information and communication system comprising:
   at least one database;
   a transaction management engine operative to manage transaction information and move the transaction information to and from the database, the management of transaction information including at least one of sending electronic bill pay information to a vendor or service provider, monitoring email traffic in anticipation of an arrival of a bill, correlating a bill with calendar events, thereby associating the bill with an appropriate book keeping category, preparing portions of expense vouchers, allowing a user to group items together as a transaction, automatically connecting entities into a representation of a transaction, tracking sessions, correlating a plurality of session together, using configuration management techniques to complete a view of a transaction and/or session element, providing a view of incomplete transactions to a user, allowing a user to update an element in a transaction and providing for the labeling of received messages as belonging to one or more transaction or one or more transaction type;
   an access management engine for maintaining security of the system wherein the access management engine is operative to hold records of at least one user and associates of the user and information to which the at least one user and associates have shared access and to provide permission for accessing the at least one database;
   an information mining engine operative to sort information within the at least one database and to locate information stored on remote devices; and,
   an input control engine operative to maintain and use device drivers accepting and managing input from the user through the associated devices.

2. The enterprise information and communication system of claim 1 further comprising a profile manager operative to store and analyze information in the at least one database about the at least one user and about devices associated with the system.

3. The enterprise information and communication system of claim 1 further comprising a time a management engine operative to maintain control of time sensitive events and information in the at least one database and to generate messages regarding time sensitive information.

4. The enterprise information and communication system of claim 1 further comprising an information translation engine operative to present information from and to accept information for the at least one database via the associated devices.

5. The enterprise information and communication system of claim 1 further comprising a provisioning engine operative to accept, store and coordinate information and communication system configuration information.

6. The enterprise information and communication system of claim 1 further comprising a control operative to negotiate and allocate information and communication system resources.

7. The enterprise information and communication system of claim 1 further comprising:
   a central communications device operative to access the at least one database and at least one of the transaction management engine, access management engine, and for communicating with a local network.

8. The enterprise information and communication system of claim 7 further comprising:
   a plurality of output devices linked to the central communications device.

9. The enterprise information and communication system of claim 8 wherein the plurality of output device further comprises:
   at least one of a display, a monitor, a television, an audio speaker and speaker driving system, a computer, a palm top, a telephone, an electronic toy, a cell phone, a baby monitor and a lap top computer.

10. The enterprise information and communication system of claim 7 further comprising:
    a plurality of input devices linked to the central communications device.

11. The enterprise information and communication system of claim 10 wherein the plurality of input device further comprises:
    at least one of a keyboard, a microphone, a position sensor, a computer, a palm top, a telephone, an electronic toy, a cell phone, a refrigerator data pad, a baby monitor, a global positioning system receiver and a lap top computer.

12. An enterprise information and communications system comprising:
    at least one database;
    an information pusher operative to send information from the at least one database to at least one provisioned recipient based on at least one provisioned event;
    an information puller operative to request information from other systems to be stored, at least temporarily in the at least one database
    an information sender operative to supply information from the at least one database, requested in an information pull from outside the enterprise information system
    an information receiver operative to review and possibly store information pushed at the information and communication system from outside the information and communication system; and,
    a transaction management engine operative to manage transaction information and move the transaction information to and from the database the management of transaction information including at least one of pushing electronic bill pay information to a vendor or service provider through the services of the information pusher, monitoring email traffic in anticipation of an arrival of a bill through the services of the information receiver, correlating a bill with calendar events, thereby associating the bill with an appropriate book keeping category, preparing portions of expense vouchers, allowing a user to group items together as a transaction, automatically connecting entities into a representation of a transaction, tracking sessions, correlating a plurality of session together, using configuration management techniques to complete a view of a transaction and/or session element, providing a view of incomplete transactions to a user, allowing a user to update an element in a transaction and providing for the labeling of received messages received from the information receiver as belonging to one or more transaction or one or more transaction type.

13. The enterprise information and communication system of claim 12 further comprising:
a central communications device operative to access the at least one database and for communicating with a local network.

14. The enterprise information and communication system of claim 13 further comprising:
a plurality of output devices linked to the central communications device via the local network.

15. The enterprise information and communication system of claim 14 wherein the plurality of output device further comprises:
at least one of a display, a monitor, a television, an audio speaker and speaker driving system, a computer, a palm top, a telephone, an electronic toy, a cell phone, a baby monitor and a lap top computer.

16. The enterprise information and communication system of claim 13 further comprising:
a plurality of input devices linked to the central communications device via the local network.

17. The enterprise information and communication system of claim 16 wherein the plurality of input device further comprises:
at least one of a keyboard, a microphone, a position sensor, a computer, a palm top, a telephone, an electronic toy, a cell phone, a refrigerator data pad, a baby monitor, a global positioning system receiver and a lap top computer.

* * * * *